(12) United States Patent
Osuga

(10) Patent No.: US 9,678,922 B2
(45) Date of Patent: Jun. 13, 2017

(54) DATA STORAGE CONTROL SYSTEM, DATA STORAGE CONTROL METHOD, AND DATA STORAGE CONTROL PROGRAM

(75) Inventor: Toru Osuga, Tokyo (JP)

(73) Assignee: NEC CORPORATION, Tokyo (JP)

(*) Notice: Subject to any disclaimer, the term of this patent is extended or adjusted under 35 U.S.C. 154(b) by 258 days.

(21) Appl. No.: 13/823,586

(22) PCT Filed: Sep. 26, 2011

(86) PCT No.: PCT/JP2011/071827
§ 371 (c)(1),
(2), (4) Date: Mar. 14, 2013

(87) PCT Pub. No.: WO2012/056835
PCT Pub. Date: May 3, 2012

(65) Prior Publication Data
US 2013/0179533 A1    Jul. 11, 2013

(30) Foreign Application Priority Data

Oct. 29, 2010 (JP) .................................. 2010-244204

(51) Int. Cl.
*G06F 15/167* (2006.01)
*G06F 3/06* (2006.01)
*H04L 29/08* (2006.01)

(52) U.S. Cl.
CPC .......... *G06F 15/167* (2013.01); *G06F 3/061* (2013.01); *G06F 3/067* (2013.01); *G06F 3/0659* (2013.01); *H04L 67/2842* (2013.01)

(58) Field of Classification Search
CPC ...... G06F 15/167; G06F 3/061; G06F 3/0659; G06F 3/067; H04L 67/2842
See application file for complete search history.

(56) References Cited

U.S. PATENT DOCUMENTS

2009/0296670 A1* 12/2009 Luo .................. H04L 47/10
370/338
2010/0054270 A1* 3/2010 Shinozaki ......... H04L 47/10
(Continued)

FOREIGN PATENT DOCUMENTS

JP    8-147141 A    6/1996
JP    10-222699 A   8/1998
(Continued)

OTHER PUBLICATIONS

English translation of an Office Action dated Jan. 4, 2016 from the Japanese Patent Office in a related/counterpart application.

*Primary Examiner* — Chris Parry
*Assistant Examiner* — Soe M Hlaing
(74) *Attorney, Agent, or Firm* — Sughrue Mion, PLLC

(57) ABSTRACT

A reduction in network load as well as an increase in speed of response through caching and an increase in communication efficiency through buffering are both achieved. A data storage control system that temporarily stores and controls data exchanged between a user terminal 1 and an online storage device 3 includes a storage unit 24 that temporarily stores receive data read from the online storage device 3 by the user terminal 1 and transmit data to be written in the online storage device 3 by the user terminal 1, and a data transmission unit 12 and a data control unit 23 that cause new storage of the transmit data in the storage unit 24 to wait in a case where a volume of the transmit data stored in the storage unit 24 is greater than a threshold value and/or in a case where an elapsed time from a last access to the receive data that is planned to be deleted next time among the receive data stored in the storage unit 24 is shorter than a threshold value.

4 Claims, 3 Drawing Sheets

(56) References Cited

U.S. PATENT DOCUMENTS

2010/0153415 A1* 6/2010 Muntz ................ H04L 67/1097
2010/0281189 A1* 11/2010 Yu et al. ................ G06F 13/385
2011/0238927 A1* 9/2011 Hatano ................ G06F 12/126

FOREIGN PATENT DOCUMENTS

| JP | 2002-202929 A | 7/2002 |
| JP | 2003-196144 A | 7/2003 |
| JP | 2006-33048 A | 2/2006 |
| JP | 2009-111890 A | 5/2009 |
| JP | 2009-537909 A | 10/2009 |

* cited by examiner

DATA STORAGE CONTROL SYSTEM, DATA STORAGE CONTROL METHOD, AND DATA STORAGE CONTROL PROGRAM

CROSS REFERENCE TO RELATED APPLICATIONS

This application is a National Stage of International Application No. PCT/JP2011/071827 filed Sep. 26, 2011, claiming priority based on Japanese Patent Application No. 2010-244204, filed Oct. 29, 2010, the contents of all of which are incorporated herein by reference in their entirety.

BACKGROUND

The present invention relates to a data storage control system, a data storage control method, and a data storage control program.

Along with the spread of computers and digitization of information, the total amounts and values of data managed by users have been increasing. Online storage services in which such vast and important data is stored as a backup in storage on a network to enable use from a plurality of terminals has been gaining attention.

Since all interactions are through a network when an online storage is to respond to all accesses in such an online storage service, load on the network increases, and the quality of service decreases.

In order to solve this problem, it is conceivable, for example, to cache data frequently accessed by a user or to accumulate data to be written in the online storage in a buffer and write buffer data collectively in the online storage. It is possible to reduce the load on the network and increase the speed of response by caching the data frequently accessed by a user, and it is possible to improve the efficiency of communication by accumulating the data to be written in the online storage in the buffer and writing the buffer data collectively in the online storage.

Patent Document 1 shown below discloses a technique of caching content of a content distribution site, and Patent Document 2 shown below discloses a technique of controlling the timing at which data in a buffer memory is written in a disk device.

Patent Document 1: Patent Publication JP-A-2009-111890

Patent Document 2: Patent Publication JP-A-H08-147141

In the techniques of the respective patent documents described above, caching of receive data and buffering of transmit data are each controlled independently. However, in the case where cache data and buffer data are stored in the same memory, it is conceivable that the capacity of cache may be insufficient depending on, for example, an occurrence frequency of the transmit data or upload interval of the transmit data, if the techniques of the respective patent documents are merely combined. In such a case, the load on a network increases, and the response or communication efficiency deteriorates.

SUMMARY

Thus, the present invention has been made in order to solve the problem described above and has an object of providing a data storage control system, a data storage control method, and a data storage control program that can achieve both a reduction of network load as well as an increase in the speed of response through caching and an increase in communication efficiency through buffering.

A data storage control system of the present invention temporarily stores and controls data exchanged between a user terminal and an online storage device, the data storage control system including: a storage unit that temporarily stores receive data read from the online storage device by the user terminal and transmit data to be written in the online storage device by the user terminal respectively; and a data storage control unit that causes new storage of the transmit data by the storage unit to wait in a case where a volume of the transmit data temporarily stored by the storage unit is greater than a threshold value and/or in a case where an elapsed time from a last access to the receive data that is planned to be deleted next time among the receive data temporarily stored by the storage unit is shorter than a threshold value.

A data storage control method of the present invention is for controlling a data storage control system that temporarily stores and controls data exchanged between a user terminal and an online storage device, the data storage control method including: a storing step of temporarily storing, in a storage device, receive data read from the online storage device by the user terminal and transmit data to be written in the online storage device by the user terminal respectively; and a data storage controlling step of causing storage of the transmit data to be performed next time in the storing step to wait in a case where a volume of the transmit data temporarily stored in the storage device is greater than a threshold value and/or in a case where an elapsed time from a last access to the receive data that is planned to be deleted next time among the receive data temporarily stored in the storage device is shorter than a threshold value.

A data storage control program of the present invention causes a computer to execute each step included in the data storage control method described above.

With the present invention, a reduction in network load as well as an increase in the speed of response through caching and an increase in communication efficiency through buffering can both be achieved.

DETAILED DESCRIPTION

A preferred embodiment for a data storage control system, a data storage control method, and a data storage control program according to the present invention will be described below with reference to the accompanying drawings.

Figure 1:
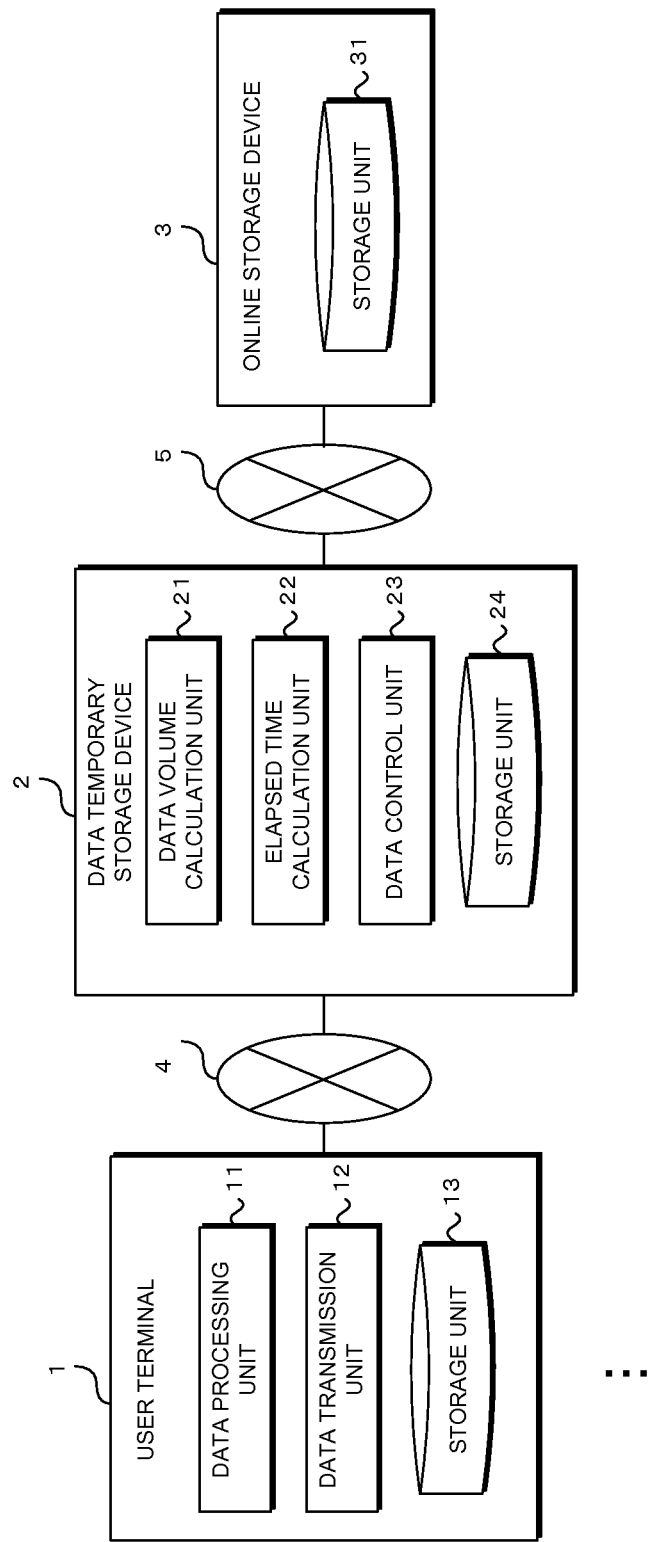
FIG. 1 is a block diagram showing an example of the configuration of a data storage control system in an embodiment.

First, the configuration of the data storage control system in the embodiment will be described with reference to FIG. 1. As shown in FIG. 1, the data storage control system includes one or a plurality of user terminals 1, a data temporary storage device 2, and an online storage device 3.

The user terminal 1 and the data temporary storage device 2 are connected via a local network 4, and the data temporary storage device 2 and the online storage device 3 are connected via a wide area network 5. The local network 4 is, for example, a local area network (LAN) within a building or an access network between a building and a base station.

The wide area network 5 is, for example, the Internet or a next generation network (NGN).

The user terminal 1 includes a storage unit 13 that stores data registered, referenced, or updated by a user, the online storage device 3 includes a storage unit 31 that stores a part or all of the data stored in the storage unit 13 of each user terminal 1, and the data temporary storage device 2 includes a storage unit 24 that temporarily stores data exchanged between the user terminal 1 and the online storage device 3.

Data read from the storage unit 31 of the online storage device 3 by the user terminal 1 is temporarily cached in the storage unit 24 of the data temporary storage device 2 as receive data and used the next time the user terminal 1 reads that data. Data to be written in the storage unit 31 of the online storage device 3 by the user terminal 1 is temporarily buffered in the storage unit 24 of the data temporary storage device 2 as transmit data and stored in the storage unit 31 of the online storage device 3 collectively at every predetermined time.

Herein, the user terminal 1, the data temporary storage device 2, and the online storage device 3 are physically configured to include, for example, a central processing unit (CPU), a storage device, and an input-output interface, and the user terminal 1 further includes an input device and a display device. The storage device includes, for example, a read-only memory (ROM) or hard disk drive (HDD) that stores a program or data processed by the CPU, a storage that stores various data, and a random-access memory (RAM) mainly used as various work areas for control processing. The input device includes, for example, a mouse or keyboard. These components are connected with each other via a bus.

By the CPU executing the program stored in the ROM and processing a message received via the input-output interface, data input from the input device, or data loaded into the RAM, for example, each function of each device described below can be achieved. Each function of each device will be described below.

As shown in FIG. 1, the user terminal 1 includes a data processing unit 11 and a data transmission unit 12.

The data processing unit 11 determines whether or not reference subject data exists in the storage unit 13, in the case where a data reference instruction is received from the user. In the case where the reference subject data exists in the storage unit 13, the reference subject data is acquired from the storage unit 13 and displayed in the display device by the data processing unit 11. In the case where the reference subject data does not exist in the storage unit 13, the reference subject data is acquired from the data temporary storage device 2 and displayed in the display device by the data processing unit 11.

The data processing unit 11 stores register-or-update subject data in the storage unit 13, in the case where a data register-or-update instruction is received from the user. After storing the register-or-update subject data in the storage unit 13, the data processing unit 11 transmits a termination notification to the data transmission unit 12 upon terminating a register-or-update application.

The data transmission unit 12 transmits the register-or-update subject data to the data temporary storage device 2. The data transmission unit 12 performs a transmit/wait determination with the following procedure before transmitting the register-or-update subject data, which is transmitted in the case where a determination requirement is satisfied.

Every time the termination notification is received from the data processing unit 11 (or at every predetermined time), the data transmission unit 12 acquires, from the data temporary storage device 2, the volume (hereinafter referred to as "transmit data volume") of the register-or-update subject data (transmit data) temporarily stored in the storage unit 24 of the data temporary storage device 2 and an elapsed time (hereinafter referred to as "last access elapsed time") from the last access to the reference subject data (receive data) that is planned to be deleted the next time from the storage unit 24 of the data temporary storage device 2. Based on the transmit data volume and the last access elapsed time acquired from the data temporary storage device 2, the data transmission unit 12 determines whether or not to wait before transmitting the register-or-update subject data to the data temporary storage device 2.

The content of the determination requirement will be specifically described. In the case where the transmit data volume is greater than a threshold value (first threshold value) set in advance and/or in the case where the last access elapsed time is shorter than a threshold value (second threshold value) set in advance, the data transmission unit 12 waits before transmitting the register-or-update subject data to the data temporary storage device 2.

The first threshold value may be set such that a cache area (storage area in which the receive data is temporarily stored) of the storage unit 24 falls within a range in which a cache effect (effect of reducing the network load and increasing the speed of response) can be obtained. The second threshold value may be set such that the last access elapsed time falls within a range in which the cache effect can be obtained.

In the case of waiting before transmission, the data transmission unit 12 repeats the determination in a similar manner again after a predetermined time has elapsed. The predetermined time may be a certain interval or may be a random interval. On the other hand, in the case where the determination requirement is not satisfied, the register-or-update subject data is acquired from the storage unit 13 and transmitted to the data temporary storage device 2 by the data transmission unit 12.

As shown in FIG. 1, the data temporary storage device 2 includes a data volume calculation unit 21, an elapsed time calculation unit 22, and a data control unit 23.

The data volume calculation unit 21 calculates the capacity of a buffer area, i.e., the transmit data volume, in which the register-or-update subject data is temporarily stored out of the storage area of the storage unit 24. The data volume calculation unit 21 calculates the transmit data volume at every request from the user terminal 1 and returns the calculated transmit data volume to the user terminal 1. Note that the transmit data volume may be calculated at every predetermined time. In this case, the data volume calculation unit 21 returns the newest transmit data volume most recently calculated to the user terminal 1 upon a request from the user terminal 1.

The elapsed time calculation unit 22 calculates the elapsed time, i.e., the last access elapsed time, from the last access to the reference subject data that is planned to be deleted next among the reference subject data temporarily stored in the storage unit 24 as a cache. The elapsed time calculation unit 22 calculates the last access elapsed time at every request from the user terminal 1 and returns the calculated last access elapsed time to the user terminal 1. Note that the last access elapsed time may be calculated at every predetermined time. In this case, the elapsed time calculation unit 22 returns the newest last access elapsed time most recently calculated to the user terminal 1 upon a request from the user terminal 1.

The data control unit 23 controls exchange of the reference subject data or the register-or-update subject data, input and output of the storage unit 24, or the like. The content of control will be specifically described below.

The data control unit 23 determines whether or not the reference subject data exists in the storage unit 24, in the case where an acquisition request for the reference subject data is received from the user terminal 1. In the case where the reference subject data exists in the storage unit 24, the reference subject data is acquired from the storage unit 24 and returned to the user terminal 1 by the data control unit 23. In the case where the reference subject data does not exist in the storage unit 24, the reference subject data is acquired from the storage unit 31 of the online storage device 3 and returned to the user terminal 1 by the data control unit 23.

In the case where the reference subject data is acquired from the online storage device 3, the data control unit 23 determines whether or not to cache the reference subject data in the storage unit 24. In the case where the reference subject data is determined to be cached in the storage unit 24, the data control unit 23 stores the reference subject data in the storage unit 24.

As the determination requirement on whether or not to perform caching, the following determination requirement may be employed, for example. (1) Cache all reference subject data unconditionally. (2) Determine whether or not to perform caching randomly with a probability set in advance. (3) Determine whether or not perform caching according to a file type of data. (4) Determine whether or not to perform caching randomly with a probability set for each file type of data.

In the case where the storage capacity of the storage unit 24 is insufficient at the time when data is to be cached in the storage unit 24, the data control unit 23 deletes a part of the reference subject data stored in the storage unit 24 before storing. As a selection method for the reference subject data to be deleted, a method using a cache deletion algorithm such as first-in-first-out (FIFO), least recently used (LRU), or least frequently used (LFU), a method of referencing an access log of data and deleting the reference subject data of which the access frequency is lowest within a certain time, a method in which the priority depending on the file type is taken into consideration in these methods, or the like may be employed, for example.

The data control unit 23 performs buffering in the storage unit 24, in the case where the register-or-update subject data is received from the user terminal 1. In the case where data before update of the register-or-update subject data is cached in the storage unit 24 at the time of buffering, the data control unit 23 deletes that data before update from the storage unit 24. Note that in the case where the storage capacity of the storage unit 24 is insufficient at the time of buffering, a method similar to the method of deleting a part of the reference subject data at the time of caching described above is used to perform deletion.

The data control unit 23 collectively transmits a part or all of register-or-update data stored in the storage unit 24 to the online storage device 3 at every predetermined time. The data control unit 23 deletes, from the storage unit 24, the register-or-update data transmitted to the online storage device 3. Note that the timing of collective transmission is not limited to the predetermined time and may be, for example, when the wide area network 5 is available or when a permission for upload is received from the online storage device 3.

Figure 2:
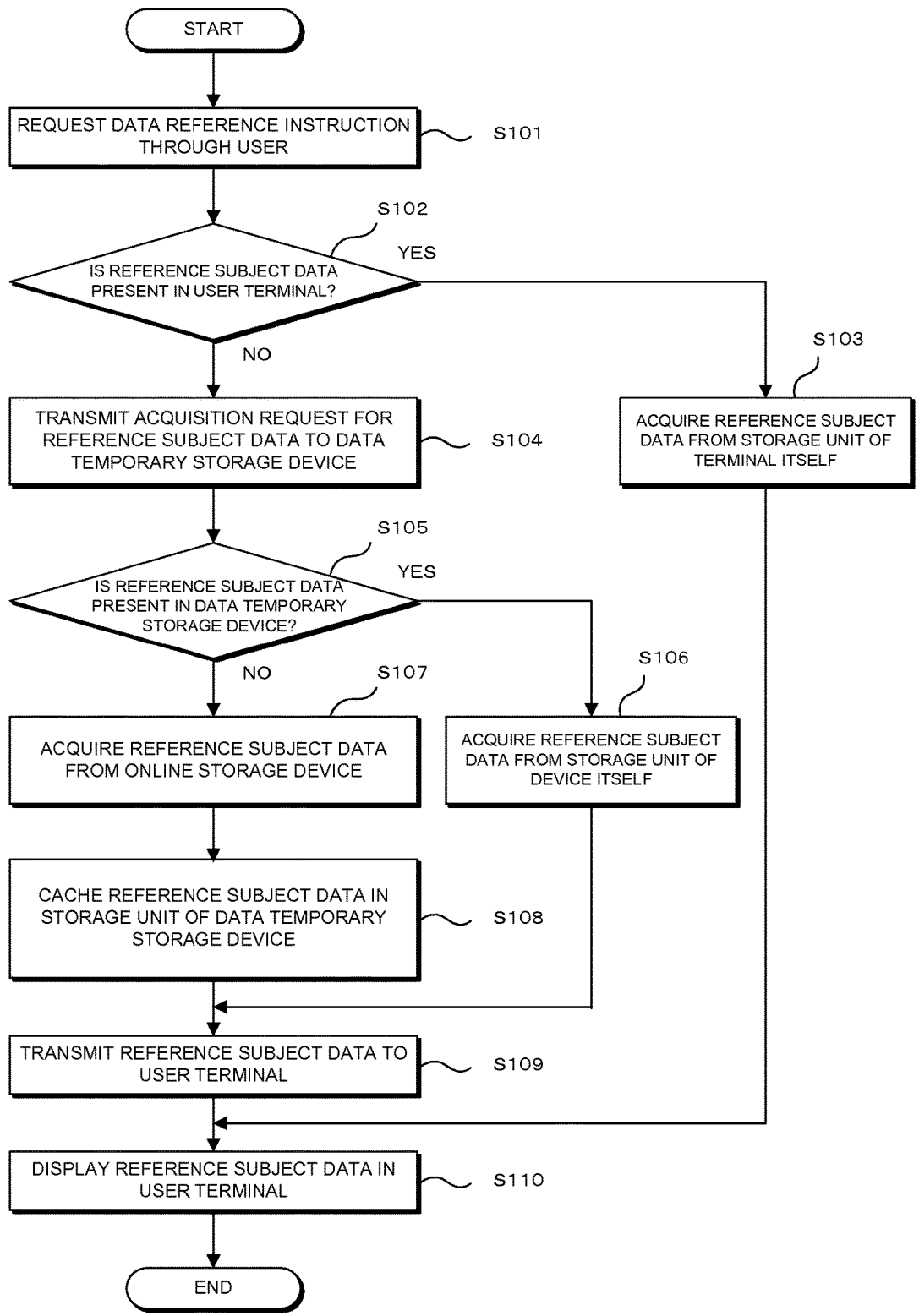
FIG. 2 is a flowchart for illustrating the operation at the time when data is referenced with a user terminal.
Figure 3:
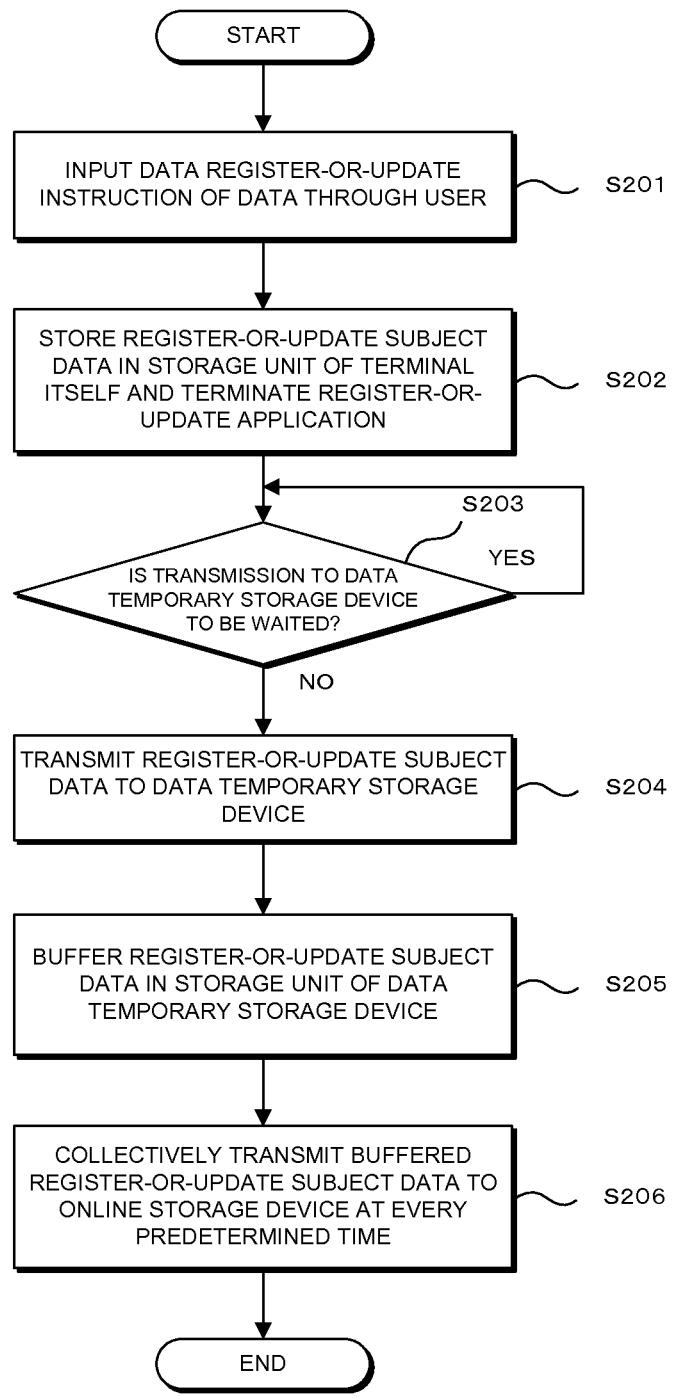
FIG. 3 is a flowchart for illustrating the operation at the time when data is registered or updated with the user terminal.

Next, the operation of the data storage control system in the embodiment will be described with reference to FIG. 2 and FIG. 3. First, the operation at the time when data is referenced with the user terminal 1 will be described with reference to FIG. 2.

First, when the user inputs the data reference instruction to the user terminal 1 (step S101), the data processing unit 11 of the user terminal 1 determines whether or not the reference subject data exists in the storage unit 13 of the user terminal 1 (step S102). In the case where the determination is YES (step S102: YES), the data processing unit 11 acquires the reference subject data from the storage unit 13 (step S103) and displays the acquired reference subject data in the display device (step S110).

On the other hand, in the case where it is determined that the reference subject data does not exist in the storage unit 13 in the determination in step S102 described above (step S102: NO), the data processing unit 11 transmits the acquisition request for the reference subject data to the data temporary storage device 2 (step S104). Accordingly, the data temporary storage device 2 receives the acquisition request for the reference subject data.

Subsequently, the data control unit 23 of the data temporary storage device 2 determines whether or not the reference subject data exists in the storage unit 24 (step S105). In the case where the determination is YES (step S105: YES), the data control unit 23 acquires the reference subject data from the storage unit 24 (step S106) and transmits the acquired reference subject data to the user terminal 1 (step S109). Then, the reference subject data is displayed in the display device of the user terminal 1 (step S110).

On the other hand, in the case where it is determined that the reference subject data does not exist in the storage unit 24 in the determination in step S105 described above (step S105: NO), the data control unit 23 of the data temporary storage device 2 acquires the reference subject data from the storage unit 31 of the online storage device 3 (step S107).

Subsequently, the acquired reference subject data is cached in the storage unit 24 (step S108) and transmitted to the user terminal 1 (step S109) by the data control unit 23 of the data temporary storage device 2. Then, the reference subject data is displayed in the display device of the user terminal 1 (step S110).

Next, the operation at the time when data is registered or updated with the user terminal 1 will be described with reference to FIG. 3.

First, when the user inputs the data register-or-update instruction to the user terminal 1 (step S201), the data processing unit 11 of the user terminal 1 stores the register-or-update subject data in the storage unit 13 of the user terminal 1 and terminates the register-or-update application (step S202). Accordingly, the termination notification is transmitted to the data transmission unit 12.

Subsequently, the data transmission unit 12 of the user terminal 1 determines whether or not to wait before transmitting the register-or-update subject data to the data temporary storage device 2 (step S203). Note that, in the determination, as described above, whether or not to wait before transmission is determined based on the transmit data volume calculated by the data volume calculation unit 21 and the last access elapsed time calculated by the elapsed time calculation unit 22.

In the case where it is determined to wait before transmission to the data temporary storage device 2 in the determination (step S203: YES), the determination in step S203 described above is performed again after a predetermined time has elapsed.

On the other hand, in the case where it is determined not to wait before transmission to the data temporary storage device 2 in the determination in step S203 described above (step S203: NO), the data transmission unit 12 of the user terminal 1 transmits the register-or-update subject data to the data temporary storage device 2 (step S204). Accordingly, the data temporary storage device 2 receives the register-or-update subject data.

Subsequently, the data control unit 23 of the data temporary storage device 2 buffers the received register-or-update subject data in the storage unit 24 of the data temporary storage device 2 (step S205).

Subsequently, the data control unit 23 of the data temporary storage device 2 collectively transmits the register-or-update subject data buffered in the storage unit 24 of the data temporary storage device 2 to the online storage device 3 at every predetermined time (step S206). Accordingly, the register-or-update subject data is stored in the storage unit 31 of the online storage device 3.

With the data storage control system in the embodiment, as described above, whether or not store the register-or-update subject data in the storage unit 24 of the data temporary storage device 2 can be determined based on the transmit data volume and the last access elapsed time. That is, it is possible to buffer the transmit data within a range in which the cache effect can be obtained. Accordingly, it is possible to avoid a situation where too much storage area is used to cache the receive data. Therefore, a reduction in network load as well as an increase in the speed of response through caching and an increase in communication efficiency through buffering can both be achieved.

Modification Example

Note that the embodiment described above is shown merely as an example and does not exclude various modifications or applications of techniques that are not explicitly stated in the embodiment. That is, the present invention may be carried out in various forms of modifications without departing from the gist thereof.

For example, although the transmit/wait determination is performed by the data transmission unit 12 of the user terminal 1 in the embodiment described above, this is not limiting. For example, the transmit/wait determination may be performed by the data control unit 23 of the data temporary storage device 2. In this case, the data control unit 23 of the data temporary storage device 2 that has received a transmit/wait determination request from the user terminal 1 performs the transmit/wait determination and returns a determination result thereof to the user terminal 1. The user terminal 1 transmits data to the data temporary storage device 2 in accordance with the determination result.

Also, a part or all of the embodiment described above may be described as in the following notes. However, the present invention is not limited to the following.

(Note 1) A data storage control system that temporarily stores and controls data exchanged between a user terminal and an online storage device, the data storage control system comprising:
  a storage unit that temporarily stores receive data read from the online storage device by the user terminal and transmit data to be written in the online storage device by the user terminal respectively; and
  a data storage control unit that causes new storage of the transmit data by the storage unit to wait in a case where a volume of the transmit data temporarily stored by the storage unit is greater than a threshold value and/or in a case where an elapsed time from a last access to the receive data that is planned to be deleted next time among the receive data temporarily stored by the storage unit is shorter than a threshold value.

(Note 2) The data storage control system according to note 1, further comprising a data volume calculation unit that calculates the volume of the transmit data temporarily stored by the storage unit and an elapsed time calculation unit that calculates the elapsed time from the last access to the receive data that is planned to be deleted next time, wherein the data storage control unit determines whether or not to cause the new storage of the transmit data by the storage unit to wait based on the volume of the transmit data calculated by the data volume calculation unit and/or the elapsed time calculated by the elapsed time calculation unit.

(Note 3) A data storage control method for controlling a data storage control system that temporarily stores and controls data exchanged between a user terminal and an online storage device, the data storage control method comprising:
  a storing step of temporarily storing, in a storage device, receive data read from the online storage device by the user terminal and transmit data to be written in the online storage device by the user terminal respectively; and
  a data storage controlling step of causing storage of the transmit data to be performed next time in the storing step to wait in a case where a volume of the transmit data temporarily stored in the storage device is greater than a threshold value and/or in a case where an elapsed time from a last access to the receive data that is planned to be deleted next time among the receive data temporarily stored in the storage device is shorter than a threshold value.

(Note 4) A data storage control program for causing a computer to execute each step according to note 3.

This application claims priority to Japanese Patent Application No. 2010-244204 filed on Oct. 29, 2010, the disclosure of which are hereby incorporated in its entirety.

A data storage control system, a data storage control method, and a data storage control program according to the present invention are suitable in achieving both a reduction of network load as well as an increase in speed of response through caching and an increase in communication efficiency through buffering.

1: User terminal
2: Data temporary storage device
3: Online storage device
4: Local network
5: Wide area network
11: Data processing unit
12: Data transmission unit
13: Storage unit
21: Data volume calculation unit
22: Elapsed time calculation unit
23: Data control unit
24: Storage unit
31: Storage unit

I claim:
1. A data storage control system that includes a temporary data storage device that is connected to more than one user terminal via a first network and connected to more than one network storage device via a second area network, and temporarily stores and controls data exchanged between the user terminal and the network storage device, wherein
  the temporary data storage device comprises:
    a sharing storage area to temporarily cache receive data read from the network storage device by the user terminal and to temporarily buffer transmit data to be written in the network storage device by the user terminal, wherein the receive data is data read from any of the network storage devices by any of the user terminals according to a data reference instruction that is input by a user; and the transmit data is data registered or updated in any of the user terminals according to a data register-or-update instruction that is input by the user, and is data written in any of the network storage devices by the user terminal, and wherein, the user terminal comprises:

at least one processor which implements:

a user terminal storage unit that stores the data registered or updated; and a data transmission unit that determines whether or not to wait before transmitting the data registered or updated, that is stored in a user terminal storage unit of the user terminal, to the data temporary storage device based on a storage area of the receive data temporarily stored in the sharing storage area at that time and/or an elapsed time from a last access to the receive data that is planned to be deleted next time among the receive data temporarily stored in the sharing storage area, wherein the data transmission unit determines to wait before transmitting the data registered or updated, that is stored in the user terminal storage unit, to the data temporary storage device in a case where a storage area of the receive data temporarily stored in the sharing storage area is smaller than a threshold value and/or in a case where an elapsed time from a last access is shorter than a threshold value.

2. The data storage control system according to claim 1, wherein the temporary data storage device further comprises:

at least one processor which implements:

a data volume calculation unit that calculates the volume of the transmit data temporarily stored in the sharing storage area; and an elapsed time calculation unit that calculates the elapsed time from the last access to the receive data that is planned to be deleted next time, wherein the data transmission unit of the user terminal determines whether or not to cause the user terminal, before transmitting to the data temporary storage device the data registered or updated, that is stored in user terminal storage unit, to wait based on the volume of the transmit data calculated by the data volume calculation unit and/or the elapsed time calculated by the elapsed time calculation unit.

3. A data storage control method for controlling a data storage control system that includes a temporary data storage device that is connected to more than one user terminal via a first network and connected to more than one network storage device via a second area network, and temporarily stores and controls data exchanged between the user terminal and the network storage device, the data storage control method comprising:

a control method of the temporary data storage device, the method comprising:

temporarily cache, in a sharing storage area of a storage device of the temporary data storage device, receive data read from the network storage device by the user terminal and to temporarily buffer transmit data to be written in the network storage device by the user terminal, wherein the receive data is data read from any of the network storage devices by any of the user terminals according to a data reference instruction that is input by a user; and the transmit data is data registered or updated in any of the user terminals according to a data register-or-update instruction that is input by the user and is data written in any of the network storage devices by the user terminal, and a control method of the user terminal, the method comprising:

storing, in a user terminal storage unit of the user terminal, the data registered or updated; and determining whether or not to wait before transmitting the data registered or updated, that is stored in the user terminal storage unit, to the data temporary storage device based on a storage area of the receive data temporarily stored in the sharing storage area at that time and/or an elapsed time from a last access to the receive data that is planned to be deleted next time among the receive data temporarily stored in the sharing storage area, wherein the determining determines to wait before transmitting the data registered or updated, that is stored in the user terminal storage unit, to the data temporary storage device in a case where a storage area of the receive data temporarily stored in the sharing storage area is smaller than a threshold value and/or in a case where an elapsed time from a last access is shorter than a threshold value.

4. A non-transitory computer readable storage medium having a data storage control program for causing a computer to execute the data storage control method according to claim 3.

* * * * *